(12) United States Patent
Dan (10) Patent No.: US 8,959,571 B2
(45) Date of Patent: Feb. 17, 2015

(54) AUTOMATED POLICY BUILDER (75) Inventor: Ephraim Dan, Tel Aviv (IL)

(73) Assignee: F5 Networks, Inc., Seattle, WA (US)

( * ) Notice: Subject to any disclaimer, the term of this patent is extended or adjusted under 35 U.S.C. 154(b) by 0 days.

(21) Appl. No.: 13/283,512

(22) Filed: Oct. 27, 2011

(65) Prior Publication Data
US 2012/0278851 A1    Nov. 1, 2012

Related U.S. Application Data (60) Provisional application No. 61/408,555, filed on Oct. 29, 2010.

(51) Int. Cl.
*H04L 29/06* (2006.01)
*H04L 12/24* (2006.01)

(52) U.S. Cl.
CPC ............ *H04L 63/20* (2013.01); *H04L 41/0893* (2013.01); *H04L 41/22* (2013.01); *H04L 63/0227* (2013.01)
USPC ................ 726/1; 726/2; 726/3; 726/4; 726/5; 713/167; 713/168

(58) Field of Classification Search
CPC ......................... H04L 67/2852; G06F 11/3072
USPC ..................................... 726/1–5; 713/167–168
See application file for complete search history.

(56) References Cited

U.S. PATENT DOCUMENTS

| | | | |
|---|---|---|---|
| 3,950,735 A | 4/1976 | Patel | |
| 4,644,532 A | 2/1987 | George et al. | |
| 4,897,781 A | 1/1990 | Chang et al. | |
| 4,965,772 A | 10/1990 | Daniel et al. | |
| 5,023,826 A | 6/1991 | Patel | |
| 5,053,953 A | 10/1991 | Patel | |
| 5,299,312 A | 3/1994 | Rocco, Jr. | |
| 5,327,529 A | 7/1994 | Fults et al. | |
| 5,367,635 A | 11/1994 | Bauer et al. | |
| 5,371,852 A | 12/1994 | Attanasio et al. | |
| 5,406,502 A | 4/1995 | Haramaty et al. | |
| 5,475,857 A | 12/1995 | Dally | |

(Continued)

FOREIGN PATENT DOCUMENTS

| | | |
|---|---|---|
| EP | 0744850 A2 | 11/1996 |
| WO | WO 91/14326 | 9/1991 |

(Continued)

OTHER PUBLICATIONS

"A Process for Selective Routing of Servlet Content to Transcoding Modules," Research Disclosure 422124, Jun. 1999, pp. 889-890, IBM Corporation.

(Continued)

*Primary Examiner* — Josnel Jeudy
(74) *Attorney, Agent, or Firm* — LeClairRyan, a Professional Corporation (57) ABSTRACT

A system, method and machine readable medium for automated policy building in a policy module of a network traffic management device is disclosed. Parsed network traffic data is received at a policy builder of a network traffic management device. The received network traffic data is analyzed in accordance with one or more threshold conditions specified by a user, via a user interface, for an existing policy. The existing policy is modified by the policy builder if the one or more threshold conditions for the network traffic have been met.

21 Claims, 6 Drawing Sheets

(56) References Cited

U.S. PATENT DOCUMENTS

| | | |
|---|---|---|
| 5,517,617 A | 5/1996 | Sathaye et al. |
| 5,519,694 A | 5/1996 | Brewer et al. |
| 5,519,778 A | 5/1996 | Leighton et al. |
| 5,521,591 A | 5/1996 | Arora et al. |
| 5,528,701 A | 6/1996 | Aref |
| 5,581,764 A | 12/1996 | Fitzgerald et al. |
| 5,596,742 A | 1/1997 | Agarwal et al. |
| 5,606,665 A | 2/1997 | Yang et al. |
| 5,611,049 A | 3/1997 | Pitts |
| 5,663,018 A | 9/1997 | Cummings et al. |
| 5,752,023 A | 5/1998 | Choucri et al. |
| 5,761,484 A | 6/1998 | Agarwal et al. |
| 5,768,423 A | 6/1998 | Aref et al. |
| 5,774,660 A | 6/1998 | Brendel et al. |
| 5,790,554 A | 8/1998 | Pitcher et al. |
| 5,802,052 A | 9/1998 | Venkataraman |
| 5,812,550 A | 9/1998 | Sohn et al. |
| 5,825,772 A | 10/1998 | Dobbins et al. |
| 5,875,296 A | 2/1999 | Shi et al. |
| 5,892,914 A | 4/1999 | Pitts |
| 5,892,932 A | 4/1999 | Kim |
| 5,919,247 A | 7/1999 | Van Hoff et al. |
| 5,936,939 A | 8/1999 | Des Jardins et al. |
| 5,941,988 A | 8/1999 | Bhagwat et al. |
| 5,946,690 A | 8/1999 | Pitts |
| 5,949,885 A | 9/1999 | Leighton |
| 5,951,694 A | 9/1999 | Choquier et al. |
| 5,959,990 A | 9/1999 | Frantz et al. |
| 5,974,460 A | 10/1999 | Maddalozzo, Jr. et al. |
| 5,983,281 A | 11/1999 | Ogle et al. |
| 5,988,847 A | 11/1999 | McLaughlin et al. |
| 6,006,260 A | 12/1999 | Barrick, Jr. et al. |
| 6,006,264 A | 12/1999 | Colby et al. |
| 6,026,452 A | 2/2000 | Pitts |
| 6,028,857 A | 2/2000 | Poor |
| 6,051,169 A | 4/2000 | Brown et al. |
| 6,078,956 A | 6/2000 | Bryant et al. |
| 6,085,234 A | 7/2000 | Pitts et al. |
| 6,092,196 A | 7/2000 | Reiche |
| 6,108,703 A | 8/2000 | Leighton et al. |
| 6,111,876 A | 8/2000 | Frantz et al. |
| 6,128,279 A | 10/2000 | O'Neil et al. |
| 6,128,657 A | 10/2000 | Okanoya et al. |
| 6,170,022 B1 | 1/2001 | Linville et al. |
| 6,178,423 B1 | 1/2001 | Douceur et al. |
| 6,182,139 B1 | 1/2001 | Brendel |
| 6,192,051 B1 | 2/2001 | Lipman et al. |
| 6,233,612 B1 | 5/2001 | Fruchtman et al. |
| 6,246,684 B1 | 6/2001 | Chapman et al. |
| 6,253,226 B1 | 6/2001 | Chidambaran et al. |
| 6,253,230 B1 | 6/2001 | Couland et al. |
| 6,263,368 B1 | 7/2001 | Martin |
| 6,289,012 B1 | 9/2001 | Harrington et al. |
| 6,298,380 B1 | 10/2001 | Coile et al. |
| 6,327,622 B1 | 12/2001 | Jindal et al. |
| 6,343,324 B1 | 1/2002 | Hubis et al. |
| 6,347,339 B1 | 2/2002 | Morris et al. |
| 6,360,270 B1 | 3/2002 | Cherkasova et al. |
| 6,374,300 B2 | 4/2002 | Masters |
| 6,396,833 B1 | 5/2002 | Zhang et al. |
| 6,430,562 B1 | 8/2002 | Kardos et al. |
| 6,434,081 B1 | 8/2002 | Johnson et al. |
| 6,484,203 B1 * | 11/2002 | Porras et al. ............ 709/224 |
| 6,484,261 B1 | 11/2002 | Wiegel |
| 6,490,624 B1 | 12/2002 | Sampson et al. |
| 6,510,135 B1 | 1/2003 | Almulhem et al. |
| 6,510,458 B1 | 1/2003 | Berstis et al. |
| 6,519,643 B1 | 2/2003 | Foulkes et al. |
| 6,601,084 B1 | 7/2003 | Bhaskaran et al. |
| 6,636,503 B1 | 10/2003 | Shiran et al. |
| 6,636,894 B1 | 10/2003 | Short et al. |
| 6,650,640 B1 | 11/2003 | Muller et al. |
| 6,650,641 B1 | 11/2003 | Albert et al. |
| 6,654,701 B2 | 11/2003 | Hatley |
| 6,683,873 B1 | 1/2004 | Kwok et al. |
| 6,691,165 B1 | 2/2004 | Bruck et al. |
| 6,708,187 B1 | 3/2004 | Shanumgam et al. |
| 6,742,045 B1 | 5/2004 | Albert et al. |
| 6,751,663 B1 | 6/2004 | Farrell et al. |
| 6,754,228 B1 | 6/2004 | Ludwig |
| 6,760,775 B1 | 7/2004 | Anerousis et al. |
| 6,772,219 B1 | 8/2004 | Shobatake |
| 6,779,039 B1 | 8/2004 | Bommareddy et al. |
| 6,781,986 B1 | 8/2004 | Sabaa et al. |
| 6,798,777 B1 | 9/2004 | Ferguson et al. |
| 6,816,901 B1 | 11/2004 | Sitaraman et al. |
| 6,829,238 B2 | 12/2004 | Tokuyo et al. |
| 6,868,082 B1 | 3/2005 | Allen, Jr. et al. |
| 6,876,629 B2 | 4/2005 | Beshai et al. |
| 6,876,654 B1 | 4/2005 | Hegde |
| 6,888,836 B1 | 5/2005 | Cherkasova |
| 6,928,082 B2 | 8/2005 | Liu et al. |
| 6,947,985 B2 * | 9/2005 | Hegli et al. ............ 709/224 |
| 6,950,434 B1 | 9/2005 | Viswanath et al. |
| 6,954,780 B2 | 10/2005 | Susai et al. |
| 6,957,272 B2 | 10/2005 | Tallegas et al. |
| 6,975,592 B1 | 12/2005 | Seddigh et al. |
| 6,987,763 B2 | 1/2006 | Rochberger et al. |
| 7,007,092 B2 | 2/2006 | Peiffer |
| 7,113,993 B1 | 9/2006 | Cappiello et al. |
| 7,139,792 B1 | 11/2006 | Mishra et al. |
| 7,228,422 B2 | 6/2007 | Morioka et al. |
| 7,287,082 B1 | 10/2007 | O'Toole, Jr. |
| 7,308,703 B2 * | 12/2007 | Wright et al. ............ 726/1 |
| 7,321,926 B1 | 1/2008 | Zhang et al. |
| 7,333,999 B1 | 2/2008 | Njemanze |
| 7,343,413 B2 | 3/2008 | Gilde et al. |
| 7,349,391 B2 | 3/2008 | Ben-Dor et al. |
| 7,454,480 B2 | 11/2008 | Labio et al. |
| 7,490,162 B1 | 2/2009 | Masters |
| 7,500,269 B2 | 3/2009 | Huotari et al. |
| 7,526,541 B2 * | 4/2009 | Roese et al. ............ 709/223 |
| 7,558,197 B1 | 7/2009 | Sindhu et al. |
| 7,580,971 B1 | 8/2009 | Gollapudi et al. |
| 7,624,424 B2 * | 11/2009 | Morita et al. ............ 726/1 |
| 7,801,978 B1 | 9/2010 | Susai et al. |
| 7,908,314 B2 | 3/2011 | Yamaguchi et al. |
| 8,130,650 B2 | 3/2012 | Allen, Jr. et al. |
| 8,380,854 B2 | 2/2013 | Szabo |
| 8,447,871 B1 | 5/2013 | Szabo |
| 2001/0023442 A1 | 9/2001 | Masters |
| 2002/0059428 A1 | 5/2002 | Susai et al. |
| 2002/0138615 A1 | 9/2002 | Schmeling |
| 2002/0161913 A1 | 10/2002 | Gonzalez et al. |
| 2002/0198993 A1 | 12/2002 | Cudd et al. |
| 2003/0046291 A1 | 3/2003 | Fascenda |
| 2003/0070069 A1 | 4/2003 | Belapurkar et al. |
| 2003/0086415 A1 | 5/2003 | Bernhard et al. |
| 2003/0108052 A1 | 6/2003 | Inoue et al. |
| 2003/0145062 A1 | 7/2003 | Sharma et al. |
| 2003/0145233 A1 | 7/2003 | Poletto et al. |
| 2003/0225485 A1 | 12/2003 | Fritz et al. |
| 2004/0117493 A1 | 6/2004 | Bazot et al. |
| 2004/0267920 A1 | 12/2004 | Hydrie et al. |
| 2004/0268358 A1 | 12/2004 | Darling et al. |
| 2005/0004887 A1 * | 1/2005 | Igakura et al. ............ 707/1 |
| 2005/0021736 A1 | 1/2005 | Carusi et al. |
| 2005/0044213 A1 | 2/2005 | Kobayashi et al. |
| 2005/0052440 A1 | 3/2005 | Kim et al. |
| 2005/0055435 A1 | 3/2005 | Gbadegesin et al. |
| 2005/0122977 A1 | 6/2005 | Lieberman |
| 2005/0154837 A1 | 7/2005 | Keohane et al. |
| 2005/0187866 A1 | 8/2005 | Lee |
| 2005/0262238 A1 | 11/2005 | Reeves et al. |
| 2006/0031520 A1 | 2/2006 | Bedekar et al. |
| 2006/0059267 A1 | 3/2006 | Cugi et al. |
| 2006/0156416 A1 | 7/2006 | Huotari et al. |
| 2006/0161577 A1 | 7/2006 | Kulkarni et al. |
| 2006/0171365 A1 | 8/2006 | Borella |
| 2006/0233106 A1 | 10/2006 | Achlioptas et al. |
| 2006/0242300 A1 | 10/2006 | Yumoto et al. |
| 2007/0016662 A1 | 1/2007 | Desai et al. |
| 2007/0064661 A1 | 3/2007 | Sood et al. |
| 2007/0083646 A1 | 4/2007 | Miller et al. |

(56) References Cited

U.S. PATENT DOCUMENTS

| | | | |
|---|---|---|---|
| 2007/0107048 | A1 | 5/2007 | Halls et al. |
| 2007/0118879 | A1 | 5/2007 | Yeun |
| 2007/0174491 | A1 | 7/2007 | Still et al. |
| 2007/0297551 | A1 | 12/2007 | Choi |
| 2008/0034136 | A1 | 2/2008 | Ulenas |
| 2008/0133518 | A1 | 6/2008 | Kapoor et al. |
| 2008/0134311 | A1 | 6/2008 | Medvinsky et al. |
| 2008/0148340 | A1 | 6/2008 | Powell et al. |
| 2008/0148381 | A1 | 6/2008 | Aaron |
| 2008/0201599 | A1 | 8/2008 | Ferraiolo et al. |
| 2008/0256224 | A1 | 10/2008 | Kaji et al. |
| 2008/0301760 | A1 | 12/2008 | Lim |
| 2009/0049230 | A1 | 2/2009 | Pandya |
| 2009/0125625 | A1 | 5/2009 | Shim et al. |
| 2009/0138749 | A1 | 5/2009 | Moll et al. |
| 2009/0141891 | A1 | 6/2009 | Boyen et al. |
| 2009/0228956 | A1 | 9/2009 | He et al. |
| 2009/0287935 | A1 | 11/2009 | Aull et al. |
| 2009/0328219 | A1 | 12/2009 | Narayanaswamy |
| 2010/0023582 | A1 | 1/2010 | Pedersen et al. |
| 2010/0122091 | A1 | 5/2010 | Huang et al. |
| 2010/0150154 | A1 | 6/2010 | Viger et al. |
| 2010/0192201 | A1 | 7/2010 | Shimoni |
| 2010/0211658 | A1 | 8/2010 | Hoogerwerf |
| 2010/0242092 | A1 | 9/2010 | Harris et al. |
| 2010/0251330 | A1 | 9/2010 | Kroeselberg et al. |
| 2010/0325277 | A1 | 12/2010 | Muthiah et al. |
| 2011/0040889 | A1 | 2/2011 | Garrett et al. |
| 2011/0047620 | A1 | 2/2011 | Mahaffey et al. |
| 2011/0066718 | A1 | 3/2011 | Susai et al. |
| 2011/0173295 | A1 | 7/2011 | Bakke et al. |
| 2011/0282997 | A1 | 11/2011 | Prince et al. |
| 2011/0321122 | A1 | 12/2011 | Mwangi et al. |
| 2012/0066489 | A1 | 3/2012 | Ozaki et al. |
| 2012/0101952 | A1* | 4/2012 | Raleigh et al. ................. 705/304 |
| 2012/0317266 | A1* | 12/2012 | Abbott .......................... 709/224 |

FOREIGN PATENT DOCUMENTS

| | | | | |
|---|---|---|---|---|
| WO | WO 95/05712 | 2/1995 | | |
| WO | WO 97/09805 | 3/1997 | | |
| WO | WO 97/45800 | 12/1997 | | |
| WO | WO 99/05829 | 2/1999 | | |
| WO | WO 99/06913 | 2/1999 | | |
| WO | WO 99/10858 | 3/1999 | | |
| WO | WO 99/39373 | 8/1999 | | |
| WO | WO 99/64967 | 12/1999 | | |
| WO | WO 00/04422 | 1/2000 | | |
| WO | WO 00/04458 | 1/2000 | | |
| WO | WO/2008067758 | * 12/2008 | .............. H04L 12/14 | |

OTHER PUBLICATIONS

F5 Networks, Inc., "BIG-IP Controller with Exclusive OneConnect Content Switching Feature Provides a Breakthrough System for Maximizing Server and Network Performance," Press Release, May 8, 2001, 2 pages, Las Vegas, Nevada.

Crescendo Networks, "Application Layer Processing (ALP)," 2003-2009, pp. 168-186, Chapter 9, CN-5000E/5500E, Foxit Software Company.

Fielding et al., "Hypertext Transfer Protocol—HTTP/1.1," Network Working Group, RFC: 2068, Jan. 1997, pp. 1-162.

Fielding et al., "Hypertext Transfer Protocol—HTTP/1.1," Network Working Group, RFC: 2616, Jun. 1999, pp. 1-176, The Internet Society.

Floyd et al., "Random Early Detection Gateways for Congestion Avoidance," Aug. 1993, pp. 1-22, IEEE/ACM Transactions on Networking, California.

Hochmuth, Phil, "F5, CacheFlow pump up content-delivery lines," Network World Fusion, May 4, 2001, 1 page, Las Vegas, Nevada.

Schaefer, Ken, "IIS and Kerberos Part 5—Protocol Transition, Constrained Delegation, S4U2S and S402P," Jul. 18, 2007, 21 pages, http://www.adopenstatic.com/cs/blogs/ken/archive/2007/07/19/8460.aspx.

"Servlet/Applet/HTML Authentication Process With Single Sign-On," Research Disclosure 429128, Jan. 2000, pp. 163-164, IBM Corporation.

"Traffic Surges; Surge Queue; Netscaler Defense," 2005, PowerPoint Presentation, slides 1-12, Citrix Systems, Inc.

Williams et al., "Forwarding Authentication," The Ultimate Windows Server 2003 System Administrator's Guide, 2003, 2 pages, Figure 10.7, Addison-Wesley Professional, Boston, Massachusetts.

"Windows Server 2003 Kerberos Extensions," Microsoft TechNet, 2003 (Updated Jul. 31, 2004), http://technet.microsoft.com/en-us/library/cc738207, Microsoft Corporation.

International Search Report and Opinion dated May 4, 2012.

Abad, C., et al., "An Analysis on the Schemes for Detecting and Preventing ARP Cache Poisoning Attacks", IEEE, Computer Society, 27th International Conference on Distributed Computing Systems Workshops (ICDCSW'07), 2007, pp. 1-8.

OWASP, "Testing for Cross site scripting", OWASP Testing Guide v2, Table of Contents, Feb. 24, 2011, pp. 1-5, (www.owasp.org/index.php/Testing_for_Cross_site_scripting).

International Search Report and the Written Opinion, for International Patent Application No. PCT/US2013/026615, Date of Mailing: Jul. 4, 2013.

F5 Networks Inc., "Configuration Guide for Local Traffic Management," F5 Networks Inc., Jan. 2006, version 9.2.2, 406 pgs.

MacVittie, Lori, "Message-Based Load Balancing," Technical Brief, Jan. 2010, pp. 1-9, F5 Networks, Inc.

* cited by examiner

AUTOMATED POLICY BUILDER

STATEMENT OF RELATED APPLICATION

The present application claims the benefit of priority based on U.S. Provisional Patent Application Ser. No. 61/408,555, filed on Oct. 29, 2010, in the name of inventor Ephraim Dan, entitled "Automated Policy Builder", all commonly owned herewith.

TECHNOLOGICAL FIELD

This technology generally relates to network communication security, and more particularly, to an automated network security policy builder.

BACKGROUND

Building a web-application security policy is a complicated and tedious task. Often, WAF (web application firewall) operators do not know how to properly build the security policy. Building a security policy also requires very specific and in-depth application knowledge and policy building information must be manually entered by a network administrator on a continuing basis.

What is needed is a system and method which automatically builds policies based on user-specified threshold values.

BRIEF DESCRIPTION OF THE DRAWINGS

FIGS. 4A-4B illustrate example user interface view in accordance with an aspect of the present disclosure.

While these examples are susceptible of embodiment in many different forms, there is shown in the drawings and will herein be described in detail preferred examples with the understanding that the present disclosure is to be considered as an exemplification and is not intended to limit the broad aspect to the embodiments illustrated.

SUMMARY

In an aspect, a method of automated policy building in a policy module in a network traffic management device is disclosed. The method comprises receiving parsed the network traffic data at a policy builder of a network traffic management device. The method comprises analyzing the received network traffic data in accordance with one or more threshold conditions specified by a user, via a user interface, for an existing policy. The method comprises modifying the existing policy if the one or more threshold conditions for the network traffic have been met.

In an aspect, a non-transitory machine readable medium having stored thereon instructions for automated policy building is disclosed. The medium comprises machine executable code which, when executed by at least one machine, causes the machine to receive parsed the network traffic data at a policy builder. The code causes the machine to analyze the received network traffic data in accordance with one or more threshold conditions specified by a user, via a user interface, for an existing policy. The code causes the machine to modify the existing policy if the one or more threshold conditions for the network traffic have been met.

In an aspect a network traffic management device comprises a network interface that is configured to receive and transmit network traffic over one or more networks. The device comprises a memory configured to store instructions for automated policy building in processor executable code. The device comprises a processor configured to execute the stored executable code which causes the processor to receive parsed the network traffic data at a policy builder of the network traffic management device. The processor is further configured to analyze the received network traffic data in accordance with one or more threshold conditions specified by a user, via a user interface, for an existing policy. The processor is further configured to modify the existing policy if the one or more threshold conditions for the network traffic have been met.

In one or more of the above aspects, data relating to the modification of the policy is stored in a memory, wherein a policy enforcer of the policy module subsequently enforces the modified policy on the network traffic.

In one or more of the above aspects, a user interface is configured to be displayed, wherein the user interface is configured to receive user input values associated with the one or more threshold conditions.

In one or more of the above aspects, one or more of the input values associated with the one or more threshold conditions are associated with a sensitivity rule in accordance with the existing policy.

In one or more of the above aspects, an interactive slider is displayed in the user interface and is configured to be set by the user over a range of values of the existing policy.

In one or more of the above aspects, parsed network traffic is received at the policy builder, wherein the policy builder previously modified the existing policy. The received network traffic data is analyzed by the policy builder in accordance with one or more threshold conditions and the policy builder again modifies the already modified policy upon determining that the one or more threshold conditions for the network traffic have been met.

DETAILED DESCRIPTION

Figure 1:
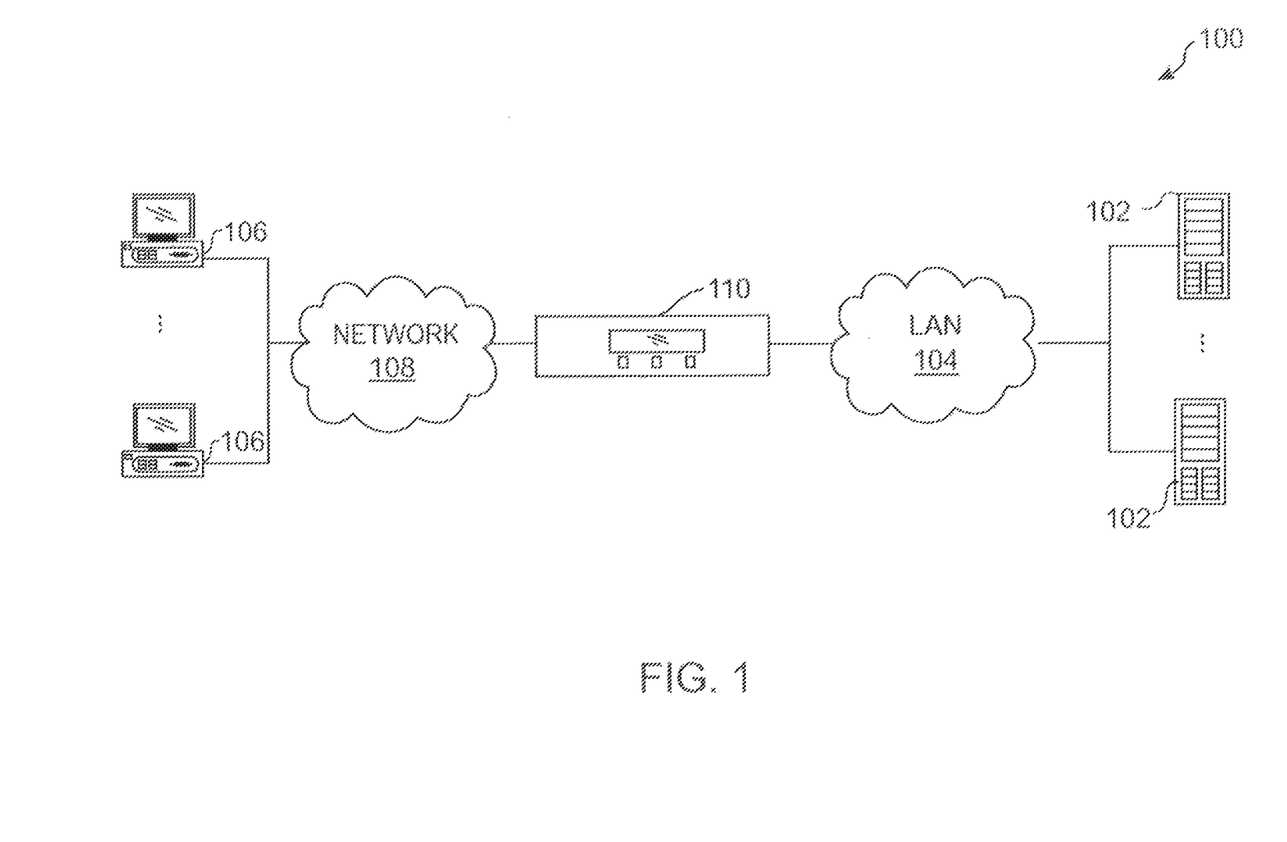
FIG. 1 is a diagram of an example system environment that includes a network traffic manager in accordance with an aspect of the present disclosure.

FIG. 1 is a diagram of an example system environment that includes a network traffic management device in accordance with an aspect of the present disclosure. The example system environment 100 includes one or more Web and/or non Web application servers 102 (referred generally as "servers"), one or more client devices 106 and one or more network traffic management devices 110, although the environment 100 could include other numbers and types of devices in other arrangements. The network traffic management device 110 is coupled to the servers 102 via local area network (LAN) 104 and client devices 106 via a wide area network 108. Generally, client device requests are sent over the network 108 to one or more servers 102 which are received or intercepted by the network traffic management device 110.

Client devices 106 comprise network computing devices capable of connecting to other network computing devices, such as network traffic management devices 110 and/or servers 102. Such connections are performed over wired and/or wireless networks, such as network 108, to send and receive data, such as for Web-based requests, receiving server responses to requests and/or performing other tasks. Non-limiting and non-exhausting examples of such client devices include personal computers (e.g., desktops, laptops), tablets, smart televisions, video game devices, mobile and/or smart phones and the like. In an example, client devices 106 can run one or more Web browsers that provide an interface for operators, such as human users, to interact with and for making requests for resources from different web and non-web servers. One or more Web-based applications may run on one or more of the servers 102 that provide the requested data back as one or more server responses to the one or more network devices.

The servers 102 comprises one or more server network devices or machines capable of operating one or more Web-based and/or non Web-based applications that may be accessed by other network devices (e.g. client devices, network traffic management devices) in the environment 100. The servers 102 can provide web objects and other data representing requested resources, such as particular Web page(s), image(s) of physical objects, JavaScript and any other objects, that are responsive to the client devices' requests. It should be noted that the servers 102 may perform other tasks and provide other types of resources. It should be noted that while only two servers 102 are shown in the environment 100 depicted in FIG. 1, other numbers and types of servers may be utilized in the environment 100.

It is also contemplated that one or more of the servers 102 may comprise a cluster of servers managed by one or more network traffic management devices 110. In one or more aspects, the servers 102 may be configured implement to execute any version of Microsoft® IIS server, RADIUS server, DIAMETER server and/or Apache® server, although other types of servers may be used. Further, additional servers may be coupled to the network 108 and many different types of applications may be available on servers coupled to the network 108.

Network 108 comprises a publicly accessible network, such as the Internet, which is connected to client devices 106. However, it is contemplated that the network 108 may comprise other types of private and public networks that include other devices. Communications, such as requests from clients 106 and responses from servers 102, take place over the network 108 according to standard network protocols, such as the HTTP, UDP and/or TCP/IP protocols in this example. However, the principles discussed herein are not limited to this example and can include other protocols. Further, it should be appreciated that network 108 may include local area networks (LANs), wide area networks (WANs), direct connections and any combination thereof, as well as other types and numbers of network types. On an interconnected set of LANs or other networks, including those based on differing architectures and protocols, routers, switches, hubs, gateways, bridges, cell towers and other intermediate network devices may act as links within and between LANs and other networks to enable messages and other data to be sent from and to network devices. Also, communication links within and between LANs and other networks typically include twisted wire pair (e.g., Ethernet), coaxial cable, analog telephone lines, full or fractional dedicated digital lines including T1, T2, T3, and T4, Integrated Services Digital Networks (ISDNs), Digital Subscriber Lines (DSLs), wireless links including satellite links and other communications links known to those skilled in the relevant arts. In essence, the network 108 includes any communication method by which data may travel between client devices 106, Web application servers 102 and network traffic management device 110, and the like.

LAN 104 comprises a private local area network that allows communications between the one or more network traffic management devices 110 and one or more servers 102 in the secured network. It is contemplated, however, that the LAN 104 may comprise other types of private and public networks with other devices. Networks, including local area networks, besides being understood by those skilled in the relevant arts, have already been generally described above in connection with network 108 and thus will not be described further.

As per the TCP/IP protocols, requests from the requesting client devices 106 may be sent as one or more streams of data packets over network 108 to the network traffic management device 110 and/or the servers 102. Such protocols can be utilized by the client devices 106, network traffic management device 110 and the servers 102 to establish connections, send and receive data for existing connections, and the like. It is to be understood that the one or more servers 102 may be hardware and/or software, and/or may represent a system with multiple servers that may include internal or external networks.

As shown in the example environment 100 depicted in FIG. 1, the network traffic management device 110 is interposed between client devices 106 with which it communicates with via network 108 and servers 102 in a secured network with which it communicates with via LAN 104. Again, the environment 100 could be arranged in other manners with other numbers and types of devices. Also, the network traffic management device 110 is coupled to network 108 by one or more network communication links and intermediate network devices (e.g. routers, switches, gateways, hubs and the like) (not shown). It should be understood that the devices and the particular configuration shown in FIG. 1 are provided for exemplary purposes only and thus are not limiting.

Generally, the network traffic management device 110 manages network communications, which may include one or more client requests and server responses, via the network 108 between the client devices 106 and one or more of the servers 102. Client requests may be destined for one or more servers 102 and may take the form of one or more data packets sent over the network 108. The client requests pass through one or more intermediate network devices and/or intermediate networks, until they ultimately reach the one or more network traffic management devices 110. In any case, the network traffic management device 110 may manage the network communications by performing several network traffic related functions involving the communications.

Figure 2A:
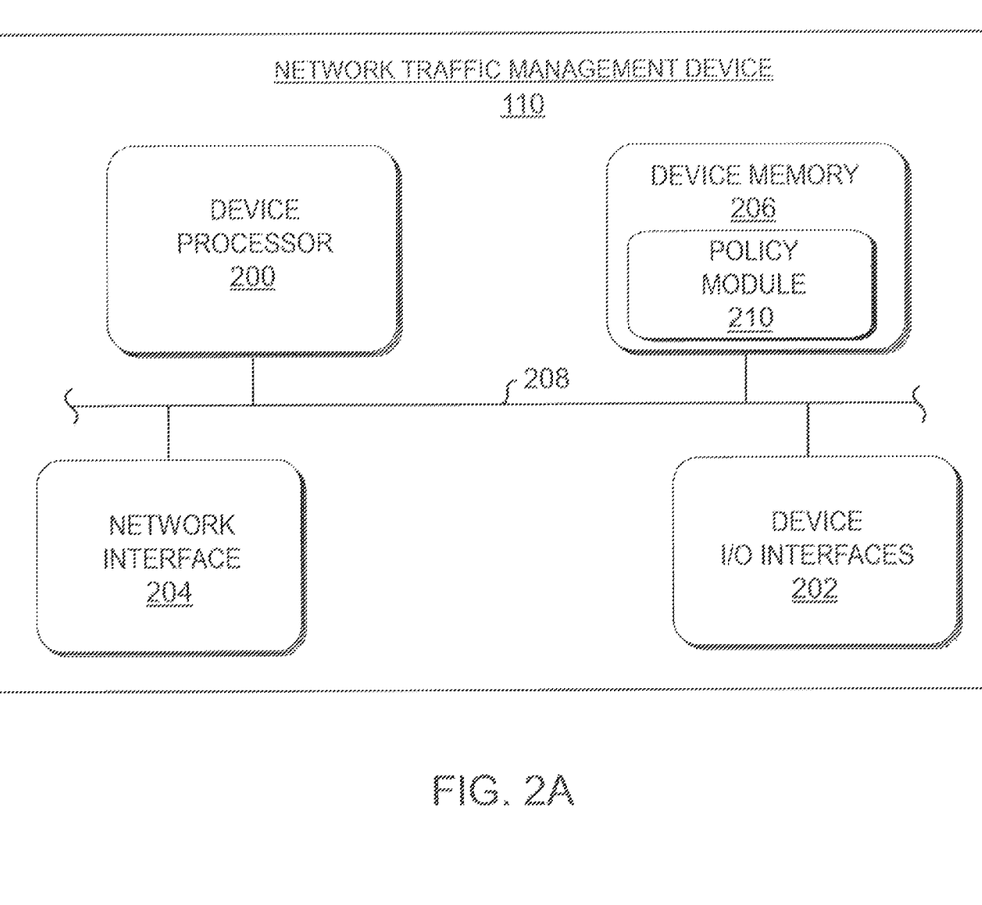
FIG. 2A is a block diagram of the network traffic manager shown in FIG. 1 in accordance with an aspect of the present disclosure.

FIG. 2A is a block diagram of the network traffic management device shown in FIG. 1 in accordance with an aspect of the present disclosure. As shown in FIG. 2A, an example network traffic management device 110 includes one or more device processors 200, one or more device I/O interfaces 202, one or more network interfaces 204, and one or more device memories 206, which are coupled together by bus 208. It should be noted that the network traffic management device 110 can be configured to include other types and/or numbers of components and is thus not limited to the configuration shown in FIG. 2A.

Device processor 200 of the network traffic management device 110 comprises one or more microprocessors configured to execute computer/machine readable and executable instructions stored in the device memory 218. Such instructions, when executed by one or more processors 200, implement general and specific functions of the network traffic management device 110. In addition, the instructions, when executed, implement the policy module 210 to perform one or more portions of the novel processes described in more detail below. It is understood that the processor 200 may comprise other types and/or combinations of processors, such as digital signal processors, micro-controllers, application specific integrated circuits ("ASICs"), programmable logic devices ("PLDs"), field programmable logic devices ("FPLDs"), field programmable gate arrays ("FPGAs"), and the like. The processor 200 is programmed or configured according to the teachings as described and illustrated herein.

Device I/O interfaces 202 comprise one or more user input and output device interface mechanisms. The interface may include a computer keyboard, mouse, display device, and the corresponding physical ports and underlying supporting hardware and software to enable the network traffic management device 110 to communicate with other network devices in the environment 100. Such communications may include accepting user data input and providing user output, although other types and numbers of user input and output devices may be used. Additionally or alternatively, as will be described in connection with network interface 204 below, the network traffic management device 110 may communicate with the outside environment for certain types of operations (e.g., configuration) via one or more network management ports.

Network interface 204 comprises one or more mechanisms that enable the network traffic management device 110 to engage in network communications over the LAN 104 and the network 108 using one or more of a number of protocols, such as TCP/IP, HTTP, UDP, RADIUS and DNS. However, it is contemplated that the network interface 204 may be constructed for use with other communication protocols and types of networks. Network interface 204 is sometimes referred to as a transceiver, transceiving device, or network interface card (NIC), which transmits and receives network data packets to one or more networks, such as the LAN 104 and the network 108. In an example, where the network traffic management device 110 includes more than one device processor 200 (or a processor 200 has more than one core), each processor 200 (and/or core) may use the same single network interface 204 or a plurality of network interfaces 204. Further, the network interface 204 may include one or more physical ports, such as Ethernet ports, to couple the network traffic management device 110 with other network devices, such as servers 102. Moreover, the interface 204 may include certain physical ports dedicated to receiving and/or transmitting certain types of network data, such as device management related data for configuring the network traffic management device 110 or client request/server response related data.

Bus 208 may comprise one or more internal device component communication buses, links, bridges and supporting components, such as bus controllers and/or arbiters. The bus 208 enables the various components of the network traffic management device 110, such as the processor 200, device I/O interfaces 202, network interface 204, and device memory 206 to communicate with one another. However, it is contemplated that the bus 208 may enable one or more components of the network traffic management device 110 to communicate with components in other devices as well. Example buses include HyperTransport, PCI, PCI Express, InfiniBand, USB, Firewire, Serial ATA (SATA), SCSI, IDE and AGP buses. However, it is contemplated that other types and numbers of buses may be used, whereby the particular types and arrangement of buses will depend on the particular configuration of the network traffic management device 110.

Device memory 206 comprises computer readable media, namely computer readable or processor readable storage media, which are examples of machine-readable storage media. Computer readable storage/machine-readable storage media may include volatile, nonvolatile, removable, and non-removable media implemented in any method or technology for storage of information. Such storage media includes computer readable/machine-executable instructions, data structures, program modules, or other data, which may be obtained and/or executed by one or more processors, such as device processor 200. Examples of computer readable storage media include RAM, BIOS, ROM, EEPROM, flash/firmware memory or other memory technology, CD-ROM, digital versatile disks (DVD) or other optical storage, magnetic cassettes, magnetic tape, magnetic disk storage or other magnetic storage devices, or any other medium which can be used to store the information, which can be accessed by a computing or specially programmed device, such as the network traffic management device 110.

Policy module 210 is depicted in FIG. 2A as being within memory 206 for exemplary purposes only; and it should be appreciated the policy module 210 may be alternatively located elsewhere. In general, the policy module 210 automatically builds, modifies and maintains policies on the fly based on analyzing representative samples of real application traffic in light of a heuristic model which incorporates one or more user-specified threshold conditions. Moreover, the policy module 210 is configured to operate with minimal or no user intervention once the threshold conditions are established by the user. However, the policy module 210 is configured to allow manual control over existing automatic processes, including, but not limited to, overriding automatic processes; accepting learning suggestions; performing specific changes and the like. Further, the policy builder 210 logs all changes that it makes in memory, thereby allowing review and auditing functions.

Figure 2B:
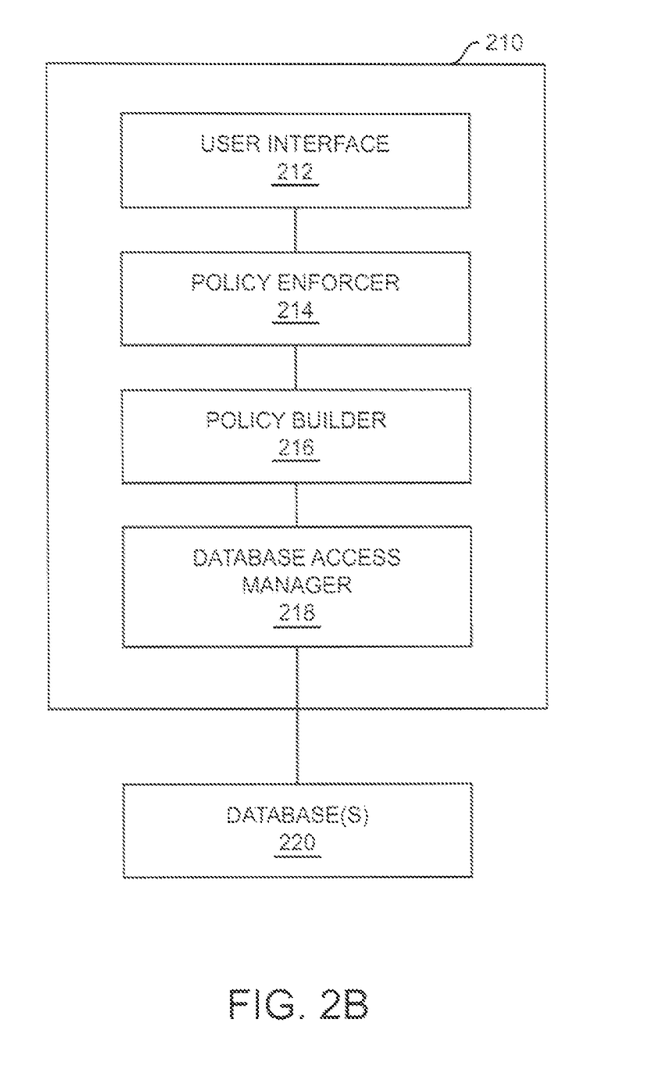
FIG. 2B is a block diagram of a policy module in accordance with an aspect of the present disclosure.

FIG. 2B is a block diagram of a policy module in accordance with an aspect of the present disclosure. As shown in FIG. 2B, the policy module 210 includes a graphical user interface module 212, a policy enforcer 214, an automated policy builder 216, and a database access manager 218. It should be noted that additional, fewer and/or different modules are contemplated in the policy module 210, and the policy module 210 is thereby not limited to the configuration shown in FIG. 2B.

Figure 4A:
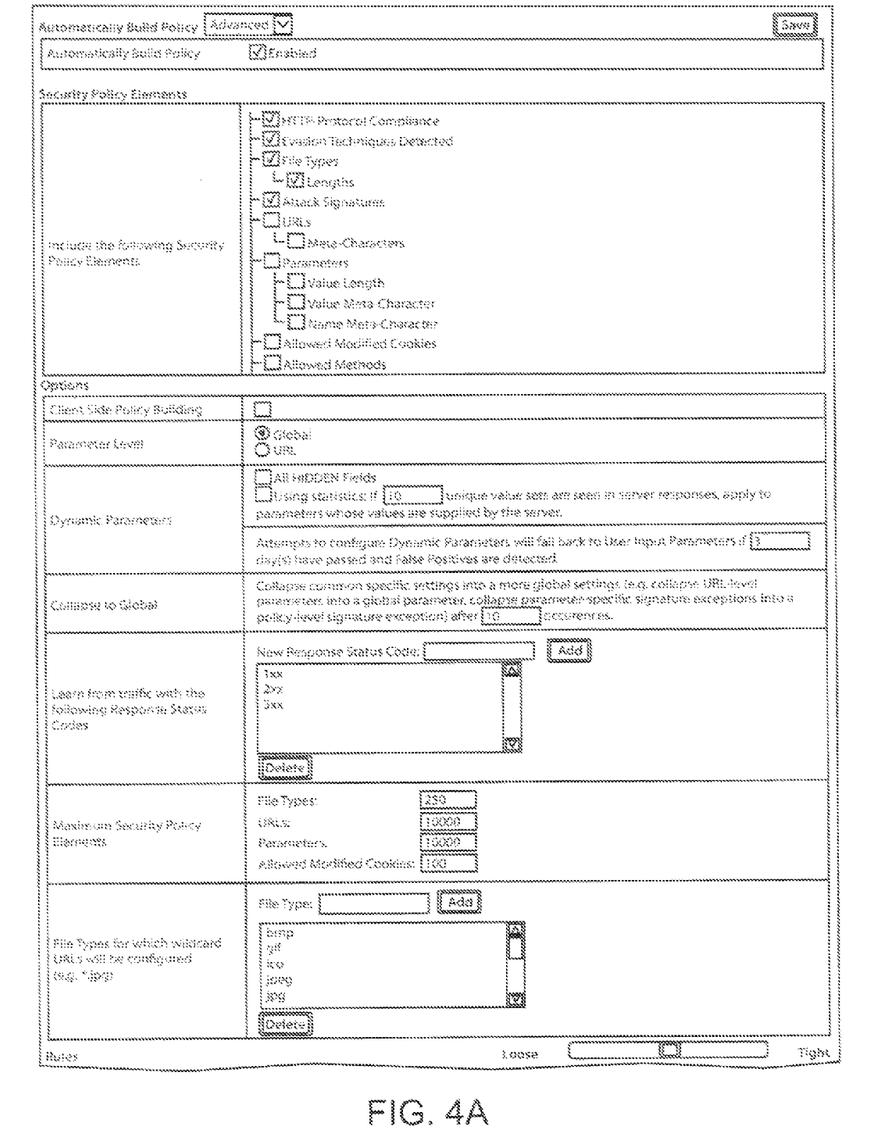

As shown in FIG. 2B, the policy module 210 utilizes a graphical user interface manager 212 which is configured to display monitoring information and input means for configuring and controlling the policy builder 216. In an aspect, the user interface manager 212 allows the user to manually identify and/or select one or more policy configuration elements (e.g. violations, entities) which the user would like the policy module 210 to configure in the policy. In an aspect, the user interface manager 212 allows the user to specify one or more rules which govern how policy changes are to be made by the policy builder 216. In an aspect, the user interface manager 212 provides the user with an option to instruct the policy builder 216 to learn new aspects of one or more application's usage. In particular, the policy module 210, via the user interface, can provide the user to set sensitivity rules (e.g. loosen, tighten, learn) which represent conditions which must be met in the analyzed network traffic to cause the policy builder 216 to trigger a particular rule for trusted traffic and/or untrusted traffic. In an aspect, the user interface manager 212 may be configured to display an interactive a slider control that allows the user to adjust configuration settings over a range of rule values (e.g. between looser sensitivity and tighter sensitivity). In an aspect, the user interface manager 212 may be configured to allow the user to adjust the policy settings while the policy builder application is running Examples views of the user interface are illustrated in FIGS.

4A and 4B. It should be noted that the illustrations in FIGS. 4A-4B are exemplary and thus are not limiting.

In an aspect, the user interface utilizes a Track Site Changes (TSC) mechanism which allows the user to manage policy changes in the web application with minimal effort. The TSC mechanism is configured to allow the user to enable an automatic TSC mode, but only from trusted IPs, because trusted traffic is less of a security concern than untrusted traffic. In particular, the user interface will provide two selectable flags for Track Site Changes, whereby one flag will turn on the TSC mechanism for trusted traffic (only traffic from trusted IPs will "loosen" the policy), whereas the other flag will turn on the TSC mechanism for untrusted traffic.

With regard to FIG. 2B, the policy enforcer 214 is configured to receive traffic information and enforce existing policies. The policy enforcer 214 outputs network traffic information for web applications that the policy enforcer 214 is interested in. In particular to an aspect, the policy enforcer 214 provides the policy builder 216 with information regarding requests and responses which violate as well as do not violate one or more policies. The policy enforcer 214 may also provide traffic summing information to the policy builder 216.

The policy builder 216 is configured to receive traffic parsing information from the policy enforcer 214. This results in an optimized implementation of the policy builder that collects statistics and performs heuristics without performing redundant parsing, policy model analysis and/or updating. The policy builder 216 is an event-driven component which reacts to a number of different events which occur in the system. In an aspect, the policy builder 216 accounts for configuration update events such as policy changes or configuration changes in management processes which control the security policies in the application layer. As stated above, the policy builder 216 also accounts for traffic data information provided by the policy enforcer 214 such as parsed request and response data, statistics data and information regarding application elements that are known and/or unknown. Further, the policy builder 216 operates with the user interface module 212 to allow the network administrator to view status requests and updates in the user interface. The policy builder 216 also operates with the database access manager 218 to store changes in the security policies in an audit log in database(s) 220.

The policy builder 216 uses a set of rules provided by the network administrator, via the user interface, which governs when policy changes are to be made. As stated above, the policy builder 216 allows the user to set and control rules via the user interface in order to configure the sensitivity of the policy builder 216. The rules can be categorized based on whether the requests and responses are trusted or untrusted. In an aspect, the policy builder 216 may be programmed to react to learn and accept web application usage to be legitimate, based on the aforementioned rules, which can be configured separately for trusted and untrusted network traffic.

In an aspect, the policy module 210 allows the network administrator, via the user interface, to specify which security policy elements are to be considered. In an aspect, the policy module 210 allows the network administrator, via the user interface, to select one or more additional security options including, but not limited to, parameter levels, consideration of dynamic parameters, setting common specific settings to global settings, status code learning, maximum number of security policy elements, file types to be considered as wildcards and the like. In an aspect, the policy module 210 allows the network administrator, via the user interface, to define sensitivity rules for trusted and/or untrusted traffic as well as define which IP addresses are to be considered as trusted.

In an aspect, the policy builder 216 may be configured by the network administrator, via the user interface, to stabilize or tighten the security policy, irrespective if whether the entity had previously been accepted as legitimate. In an aspect, the policy builder 216 may be configured to one or more sensitivity rules to be more difficult to satisfy in order to ensure that the policy settings that were previously accepted as legitimate are given enough time to be validated. The above described inputs by the network administrator are utilized by the policy builder 216 as threshold conditions which the policy builder 216 uses when analyzing network traffic to determine whether the policy should be changed or modified.

As shown in FIG. 2B, the database access manager 218 is configured to read, add and/or change policy and/or web-application level entities. In particular, all additions and changes performed by the policy builder 216 to the policy are handled by the database access manager 218. In an aspect, the database access manager 218 is configured to poll for policy model changes and write policy model updates to the one or more databases 220. In other aspects, the database access manager 218 is configured to perform other functions including, but not limited to, adding new entities; updating existing entities; terminating staging periods for violations; and enabling and disabling violations.

Figure 3:
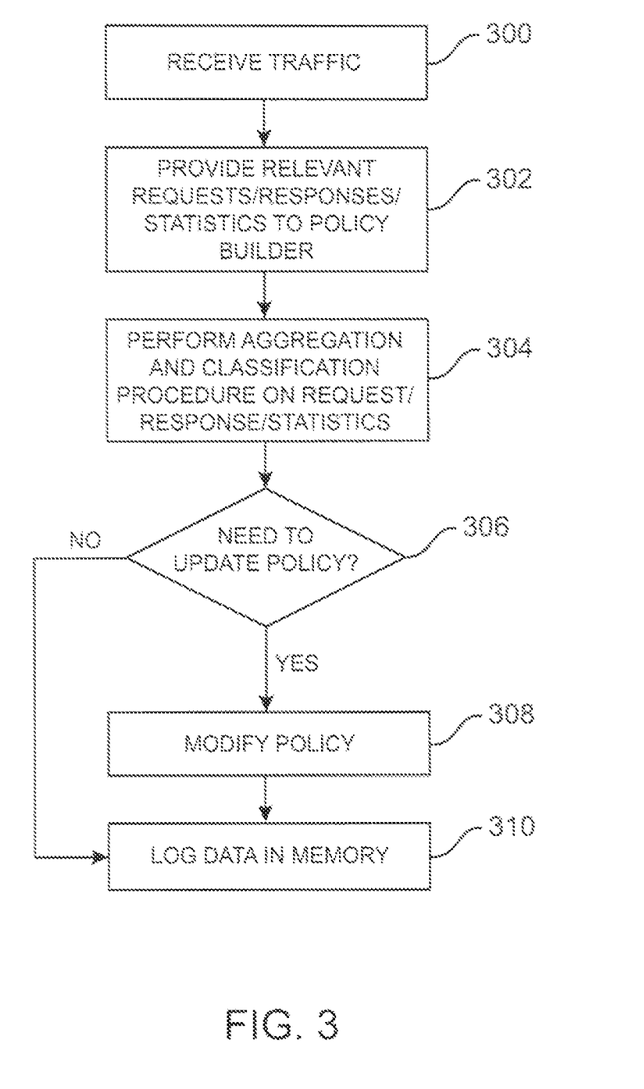
FIG. 3 is an example flow chart diagram depicting portions of processes for automated policy building in accordance with an aspect of the present disclosure.

FIG. 3 illustrates a flow chart of the automated policy building process in accordance with an aspect of the present disclosure. As shown in FIG. 3, the policy enforcer 214 of the policy module 210 enforces set policies and outputs request/response and statistics data of network traffic it is handling (Block 300). The policy builder 216 polls each event input channel and receives request/response data as well as statistics data from the policy enforcer 214 (Block 302). The policy builder 216 analyzes incoming parsed traffic and performs an aggregation and classification procedure on the relevant network traffic and statistics data based on the heuristic model that is controlled by user-specified threshold conditions described above (Block 304). The policy builder 216 then makes a decision whether to modify one or more current active policies based on the aggregation and classification procedure it performed in light of the user specified threshold conditions (Block 306). If the policy builder 216 determines that the policy should be modified, the policy builder 216 modifies the policy and instructs the database access manager 218 to store all relevant data regarding the modification in the one or more databases 220 (Block 308).

For example, for events occurring in the control plane, the policy builder 216 may update its internal configuration tables and/or policy statistics data based on its analysis. For traffic data events, the policy builder 216 may update its policy statistics data based on its analysis. For status view requests, the policy builder 216 may display the relevant policy statistics data in the user interface. This information is stored in the database(s) 220 and utilized by the policy enforcer 214 for enforcement on subsequent network traffic that is associated with the stored changed policy information.

Having thus described the basic concepts, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the examples. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method of automated policy building, the method comprising:
receiving, by a network traffic management device, network traffic, the received network traffic comprising network traffic from one or more applications;
collecting, by the network traffic management device, statistical data based on the received network traffic;
analyzing, by the network traffic management device, the collected statistical data based on the received network traffic, the analysis comprising learning network traffic usage by the one or more applications;
determining, by the network traffic management device, when the analyzed collected statistical data based on the received network traffic meets one or more threshold conditions for an existing policy;
modifying, by the network traffic management device, the existing policy to be applied to the received network traffic upon determining that the one or more threshold conditions for the received network traffic have been met, wherein the modification of the existing policy is based at least in part on the analysis of the network traffic usage by the one or more applications.

2. The method of claim 1, further comprising storing data relating to the modification of the policy, wherein the modified policy is enforced on the network traffic.

3. The method of claim 1, further comprising:
receiving, by the network traffic management device, one or more input values associated with the one or more threshold conditions.

4. The method of claim 3, wherein at least one of the one or more input values associated with the one or more threshold conditions are associated with a sensitivity rule in accordance with the existing policy.

5. The method of claim 4, further comprising receiving input to set the threshold condition over an adjustable range of values for the existing policy.

6. The method of claim 1, further comprising:
receiving parsed network traffic at the policy builder, wherein the policy builder previously modified the existing policy;
analyzing the received network traffic in accordance with one or more threshold conditions; and
modifying the already modified policy again upon determining that the one or more threshold conditions for the network traffic have been met.

7. A non-transitory machine readable medium having stored thereon instructions for automated policy building, comprising machine executable code which, when executed by at least one machine, causes the machine to:
receive network traffic, the received network traffic comprising network traffic from one or more applications;
collect statistical data based on the received network traffic;
analyze the collected statistical data based on the received network traffic, the analysis comprising learning network traffic usage by the one or more applications;
determine when the analyzed collected statistical data based on the received network traffic meets one or more threshold conditions for an existing policy; and
modify the existing policy to be applied to the received network traffic upon determining that the one or more threshold conditions have been met, wherein the modification of the existing policy is based at least in part on the analysis of the network traffic usage by the one or more applications.

8. The machine readable medium of claim 7, wherein the machine is further configured to store data relating to the modification of the policy, wherein the modified policy is enforced on the network traffic.

9. The machine readable medium of claim 7, wherein the machine is further configured to receive input values associated with the one or more threshold conditions.

10. The machine readable medium of claim 9, wherein at least one of the one or more input values associated with the one or more threshold conditions are associated with a sensitivity rule in accordance with the existing policy.

11. The machine readable medium of claim 10, wherein the machine is further configured to receive input to set the threshold condition over an adjustable range of values for the existing policy.

12. The machine readable medium of claim 7, wherein the machine is further configured to:
receive parsed network traffic at the policy builder, wherein the policy builder previously modified the existing policy;
analyze the received network traffic in accordance with one or more threshold conditions; and
modify the already modified policy again upon determining that the one or more threshold conditions for the network traffic have been met.

13. A network traffic management device comprising:
a network interface configured to receive and transmit network traffic over one or more networks, wherein the network interface receives network traffic;
a memory configured to store instructions for automated policy building in processor executable code; and
a processor configured to execute the stored executable code which causes the processor to:
receive the network traffic, the received network traffic comprising network traffic from one or more applications;
collect statistical data based on the received network traffic;
analyze the collected statistical data based on the received network traffic, the analysis comprising learning network traffic usage by the one or more applications;
determine when the analyzed collected statistical data based on the received network traffic meets one or more threshold conditions for an existing policy; and
modify the existing policy to be applied to the received network traffic upon determining that the one or more threshold conditions for the network traffic have been met, wherein the modification of the existing policy is based at least in part on the analysis of the network traffic usage by the one or more applications.

14. The network traffic management device of claim 13, wherein the processor is further configured to store data relating to the modification of the policy, wherein the modified policy is enforced on the network traffic.

15. The network traffic management device of claim 13, wherein the processor is further configured to receive input values associated with the one or more threshold conditions.

16. The network traffic management device of claim 15, wherein at least one of the one or more input values associated with the one or more threshold conditions are associated with a sensitivity rule in accordance with the existing policy.

17. The network traffic management device of claim 16, wherein the processor is further configured to receive input to set the threshold condition over an adjustable range of values of the existing policy.

18. The network traffic management device of claim 13, wherein the processor is further configured to:
   receive parsed network traffic at the policy builder, wherein the policy builder previously modified the existing policy;
   analyze the received network traffic in accordance with one or more threshold conditions; and
   modify the already modified policy again upon determining that the one or more threshold conditions for the network traffic have been met.

19. The method of claim 1, wherein the analyzing of the received network traffic further comprises:
   performing, network traffic management device, an aggregation and classification procedure on the received network traffic.

20. The machine readable medium of claim 7, wherein the analysis further comprises performing an aggregation and classification procedure performed on the received network traffic.

21. The network traffic management device of claim 13, wherein the processor is further configured for the analysis to perform an aggregation and classification procedure performed on the received network traffic.

\* \* \* \* \*